United States Patent [19]

Harden et al.

[11] 4,187,916
[45] Feb. 12, 1980

[54] SOIL CONDITIONING AND SEED BED PREPARING APPARATUS

[75] Inventors: Jerrell W. Harden, Banks; William P. Brown, Ozark, both of Ala.

[73] Assignee: Brown Manufacturing Corporation, Ozark, Ala.

[21] Appl. No.: 841,954

[22] Filed: Oct. 13, 1977

[51] Int. Cl.² .................... A01B 13/08; A01B 49/02
[52] U.S. Cl. .................................. 172/146; 111/85; 172/166; 172/572; 172/602; 172/185; 172/196
[58] Field of Search ............... 172/196, 151, 699, 459, 172/551, 572, 166, 146, 624, 177, 185, 550, 600, 603, 602, 573; 111/85, 6, 7

[56] References Cited
U.S. PATENT DOCUMENTS

| | | | |
|---|---|---|---|
| 2,357,916 | 9/1944 | Strandland | 172/166 |
| 2,529,417 | 11/1950 | Pitre | 172/185 |
| 2,787,202 | 4/1957 | Gladis | 172/572 |
| 3,042,118 | 7/1962 | Norris | 172/196 X |
| 3,202,222 | 8/1965 | Norris | 172/177 |
| 3,319,589 | 5/1967 | Moran | 172/166 X |
| 3,452,826 | 7/1969 | Lehman | 172/551 |
| 3,701,327 | 10/1972 | Krumholz | 111/81 |
| 4,004,640 | 1/1977 | Bland | 172/572 |
| 4,055,126 | 10/1977 | Brown | 172/540 |

OTHER PUBLICATIONS

Brown-Harden Super Seeder Advertising Brochure of Brown Mfg. Corp. Ozark, Ala.

*Primary Examiner*—Richard J. Johnson
*Attorney, Agent, or Firm*—LeBlanc, Nolan, Shur & Nies

[57] ABSTRACT

Soil conditioning apparatus is disclosed which has a front coulter assembly, preferably with a fluted coulter, for preparing a narrow path wider than the following subsoiler shank by cutting trash and breaking and slitting the topsoil. Following the front coulter assembly is the subsoiler assembly for further breaking the surface soil and breaking and shattering the "hard pan" created by years of conventional tillage. Following the subsoiler assembly is the slot filler assembly for filling the slot or crevice left by the subsoiler as it moves through the ground, a sufficient amount to prevent cave-ins or settling which would carry seeds too deep to properly germinate. Behind the slot filler wheel assembly means is the seed bed implement assembly for preparing the seed bed by pulverizing the soil and by removing trash which may have remained in the seed bed region after the above mentioned prior operations. The seed bed preparation implement assemblies are provided in opposed pairs, each of which is substantially universally adjustable independently of the other. The combined coulter and spider units of these assemblies are laterally, axially and angularly (about both horizontal and vertical axis) adjustable to provide the most effective seed bed preparation under any given condition. All of these elements are combined with and carried by a single mobile framework.

83 Claims, 5 Drawing Figures

SOIL CONDITIONING AND SEED BED PREPARING APPARATUS

BACKGROUND OF THE INVENTION

This invention relates to farming equipment, and more particularly, to an improved apparatus for preparing a seed bed prior to planting.

This invention is an improvement over the soil conditioning apparatus described in Ser. No. 647,465, filed Jan. 8, 1976, by Jerrell Harden and Ronald Brown, issuing Oct. 25, 1977, as U.S. Pat. No. 4,055,126.

All farm land that has been cultivated (plowed) or had any traffic on it will form a compacted layer beneath the surface. This compacted layer of soil is called a "plow pan" or "hard pan". The "hard pan" is usually 2"–4" thick and is located 6"–14" beneath the surface. On cultivated land, the depth is determined by the depth the land is plowed. There are two factors that contribute to the development of a "hard pan". One is merely the weight of the implements used to till the soil. The other is called "traffic pans". The "traffic pans" are created under the wheels of the farm tractor. As the "traffic pans" are tilled they move further down until they reach a depth where a plow will not disturb them. When soil is loose, it will be compacted to 88% of maximum density by one pass across it with an average size farm tractor. Therefore, all successive passes can compact it only 12% tighter.

The "hard pan" severly restricts plant root growth. If it is compacted tightly enough, roots cannot penetrate it; therefore, plant growth and yields are greatly restricted. The density of compaction is determined by the soil type. With no "hard pan" or other restriction, a plant's roots can grow to a depth of 6' and a width of 4' within 30 days after its seed germinates. However, when a "hard pan" is such that roots cannot penetrate it, the plant must obtain all its nutrients and moisture from the layer of earth above the "hard pan". Therefore, it must receive rain at frequent intervals in order to survive. But it can sustain itself for a longer dry period if it is feeding off six feet of earth instead of that above the "hard pan".

Numerous systems have been devised in an effort to overcome the inability of plants to penetrate the hard pan, to generally prepare better seed beds, to increase crop yield and to better preserve natural resources, such as top soil and the moisture content in the soil. Relatively recent examples of such prior systems are found in Norris et al. U.S. Pat. No. 3,170,421, issued Feb. 23, 1965, and Krumholz U.S. Pat. No. 3,701,327, issued Oct. 31, 1972.

Prior to the development of the soil conditioning apparatus described in the 4,055,126 patent, there was no single apparatus which could accomplish all of the results obtained by the U.S. Pat. No. 4,055,126 apparatus. Specifically, in a single pass under no-till conditions (i.e. the remains of the winter cover crop or the previous year's crop residue having been left in the field, such remains being generally known in the agricultural industry as "trash"), the U.S. Pat. No. 4,055,126 apparatus was able to clear trash away from the area to be prepared as a seed bed, break up the "hard pan" beneath the anticipated seed bed, fill the trench (left by the subsoiler used in breaking up the "hard pan") with broken up clods, fertilize the seed bed area uniformly, and pulverize the soil to prepare the seed bed for planting.

The present invention accomplishes the same results with better effect and greater efficiency than did the apparatus of the U.S. Pat. No. 4,055,126. Among the features and advantages of the present invention are that it saves time, money, soil, soil moisture and labor. Thus, for example, it permits seed preparation and seed planting of one or more rows in a single pass whereas conventional methods require up to seven steps, all of which necessitated separate passes across the field, further aggravating the hard pan problem. Moreover, because the present invention is able to prepare the seed bed without prior tillage, soil losses (due, for example, to erosion), which normally may be on the order of ten tons per acre or more annually using conventional tillage methods, are cut to almost zero soil loss. Further, by allowing trash to remain on the soil surface as mulch, water absorption of the soil is increased and weed production is inhibited at the same time.

The apparatus of the present invention incorporates a number of significant advantages over the earlier model described in the U.S. Pat. No. 4,055,126. The present design enables construction of four row and six row models utilizing standard lift mount connections; this was not possible in the prior apparatus. In addition, the construction and arrangement of the front coulter assembly of the present invention enables this improved apparatus to operate in fields having two to five times more trash than was the case with the older model. Further, testing has indicated that the improved apparatus will work in vetch and wet rye up to six feet high without clogging; the older model would not perform at all in vetch or acceptably in tall wet rye one foot or more in height. The improved apparatus can be made approximately 14 inches shorter than the older model, thus enabling the larger versions (four and six row models) to incorporate standard lift type mounts.

Also significantly, the improved version of this invention prepares a seed bed comparable to conventional preparation methods; the older model prepared only a minimal seed bed which contained much trash and relatively large clods, all of which resulted in establishment of detrimental air pockets or channels.

It is a principal object of this invention to provide an improved soil preparation apparatus.

It is a further object to provide an improved apparatus for preparing a seed bed under no-till conditions.

It is a further object to provide an improved soil conditioning apparatus in which trash is effectively cleared from the area of the seed bed being prepared to prevent air pockets or channels from being formed in the seed bed.

It is a further object to provide a seed bed preparation apparatus which is more compact and lighter than prior apparatus and which can be connected to a greater variety of tractors.

It is a further object to provide an improved seed bed preparation apparatus in which the seed bed preparation assemblies are substantially universally adjustable to obtain greater mixing of the soil with less trash.

Other objects and advantages will become apparent from the detailed description below.

SUMMARY OF THE INVENTION

Briefly, the improved soil conditioning apparatus of this invention comprises, in combination, a front coulter means, preferably fluted, for cutting trash and breaking and slitting the top soil. This means prepares a narrow path wider than the following subsoiler shank and allows the subsoiler shank to slide through the soil with limited soil swell or deep furrows and without collecting trash. Following the front coulter assembly is the subsoiler assembly means for further breaking the surface soil and breaking and shattering the "hard pan" created by years of conventional tillage. This allows plant roots to grow up to six feet or more through the broken "hard pan". Following the subsoiler assembly is the slot filler wheel assembly means for filling the slot or crevice left by the subsoiler as it moves through the ground. The slot filler wheel means fills the crevice, and especially the lower portion thereof, a sufficient amount to prevent cave-ins or settling which would carry seeds too deep to properly germinate. Behind the slot filler wheel assembly means is the seed bed implement assembly means for preparing the seed bed by pulverizing the soil and by removing trash which may have remained in the seed bed region after the above mentioned prior operations. All of these elements are combined with and carried by a single mobile framework.

As the apparatus is pulled over a field, e.g. by a tractor, the front coulter assembly cuts the upper 4"-6" of earth in front of the subsoiler foot so as to leave as little surface distorsion as possible. Without this coulter, the subsoiler foot would leave the land very unlevel and rough. The flatter the land is behind the subsoiler foot, the better the seed bed preparation. The front coulter assembly also cuts the surface litter so it will not drag and hang on the subsoiler foot and other implements. The coulter assembly is mounted to the main frame so as to be centered directly in front of the subsoiler foot. It also has vertical adjustment so as to control its depth. It is spring loaded to ride over obstructions which it might contact. It also swivels about 45° to the left and right of center so as to follow properly when the entire unit is planting on a curving row or across terraced fields.

The location of the front coulter assembly with respect to the subsoiler is also an important feature. By properly positioning the front coulter assembly, the rear part of the coulter will provide an additional churning function to further break up the ground in front of the subsoiler shank and brush trash to each side away from the shank path.

The subsoiler foot follows directly behind the front coulter to break and fracture the "hard pan", thereby leaving the soil in such a condition as to offer no resistance to root growth. The slot filler wheel is designed to refill the slot or opening left in the ground by the subsoiler foot. The slot filler wheel is wider than the slot left by the subsoiler foot. The slot filler wheel is hinged to the rear of the subsoiler shank and floats up and down. Upward movement during operation is limited by an adjustable stop.

The seed bed preparation implement assemblies are provided in opposed pairs, each of which is substantially universally adjustable independently of the other. The combined coulter and spider units of these assemblies are laterally, axially and angularly (about both horizontal and vertical axis) adjustable to provide the most effective seed bed preparation under any given condition.

DESCRIPTION OF THE PREFERRED EMBODIMENT

Figure 3:
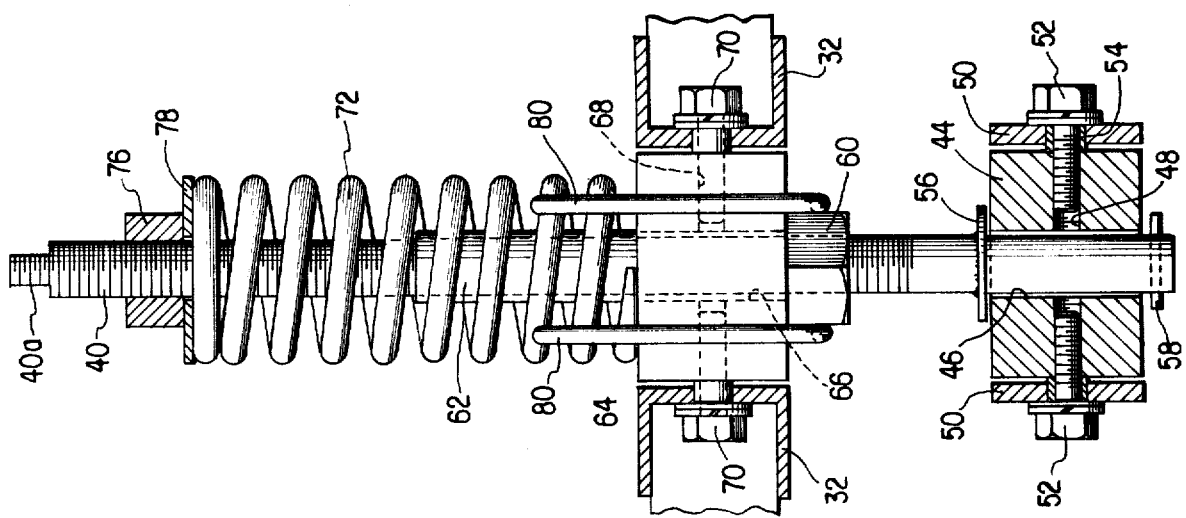
FIG. 3 shows a detail of the front coulter depth and tension adjustment.

The soil preparation apparatus of this invention primarily consists of four main subsections: a front coulter assembly, generally indicated at 2; a subsoiler assembly 4; a slot filler assembly 6; and seed bed preparation assembly 8. The four principal sub-assemblies 2, 4, 6 and 8, are mounted directly or indirectly, as will be described in more detail below, to a main frame 10 in a generally axially aligned arrangement, for reasons which will become clear below. The main frame 10 also supports a hopper assembly 12 for holding fertilizer, or the like. Although only one "row" of the complete apparatus is described in detail, it is to be noted that commercial models of the apparatus will be available in at least two, three, four and six row models (although this is by way of example and not of limitation). Further, each "row" is mounted independently to the frame 10 to permit contour soil conditioning on uneven fields.

The front coulter assembly 2 comprises a wide fluted coulter 20; in one embodiment the coulter has a diameter of 17 inches but this is exemplary only and is by no means limitative. The coulter 20 is mounted to a conventional fork 22 having a generally cylindrical stem 24 which seats in a tubular member 26 for rotation therein. A pair of flat plates 28 are welded or otherwise securely affixed to member 26. The coulter stem 24 is held in tubular member 26 by a roll key 25 or similar type of pin.

The portion of the coulter assembly described immediately above is pivotally mounted to the main frame 10 by two pairs of arms 30 and 32. At one end, each of arms 30 and 32 is pivotally secured by conventional mounting bolts to the plates 28; at their other ends, members 30 and 32 are pivotally secured also by conventional mounting bolts to the main frame 10 as shown. It is a feature of this mounting assembly arrangement that the upper pairs of arms 30 is shorter than the lower pair of arms 32; specifically, the distance between pivot points 31a and 33a is less than the distance between pivot points 31b and 33b. Also, the distance between the pivot mountings 31a and 31b is greater than the distance between pivot mountings 33a and 33b.

As the coulter moves up and down in operation, the pivotable trapezoidal mounting arrangement described above permits the coulter 20 to swing in a rearward arc rather than a forward or strictly vertical arc, as would be the case with parallel linkage mounting arrangements. This arc has a center of curvature which lies forward of the mounting arrangement in a direction away from the main frame. This permits the coulter assembly to swing behind a tractor hitch and allows the soil preparation apparatus of this invention to be hitched closer to the tractor with a shorter distance between a lift mount bar 36 and the tractor hitch. This results in a soil preparation machine which may be on the order of approximately 80 lbs. or more per row lighter than the previous machine described in U.S. Pat. No. 4,055,126. Another advantage of being able to shorten the distance between the tool bar and the tractor hitch is that it permits the four and six row models of the improved apparatus to be used with conventional lift type tractor mounts. It was possible with the prior machine described in the U.S. Pat. No. 4,055,126 to use a universal mount for the two and three row models, and special custom made lift type mounts could be used with four row models; as a practical matter, however, it was structurally impossible to use lift type mounts with a six row model of the prior machine. By virtue of the structural arrangement in the present invention, it is now structurally possible and commercially practical to configure the apparatus for standard lift type tractor mounts as well as for draw or pull type mounts.

Figure 2:
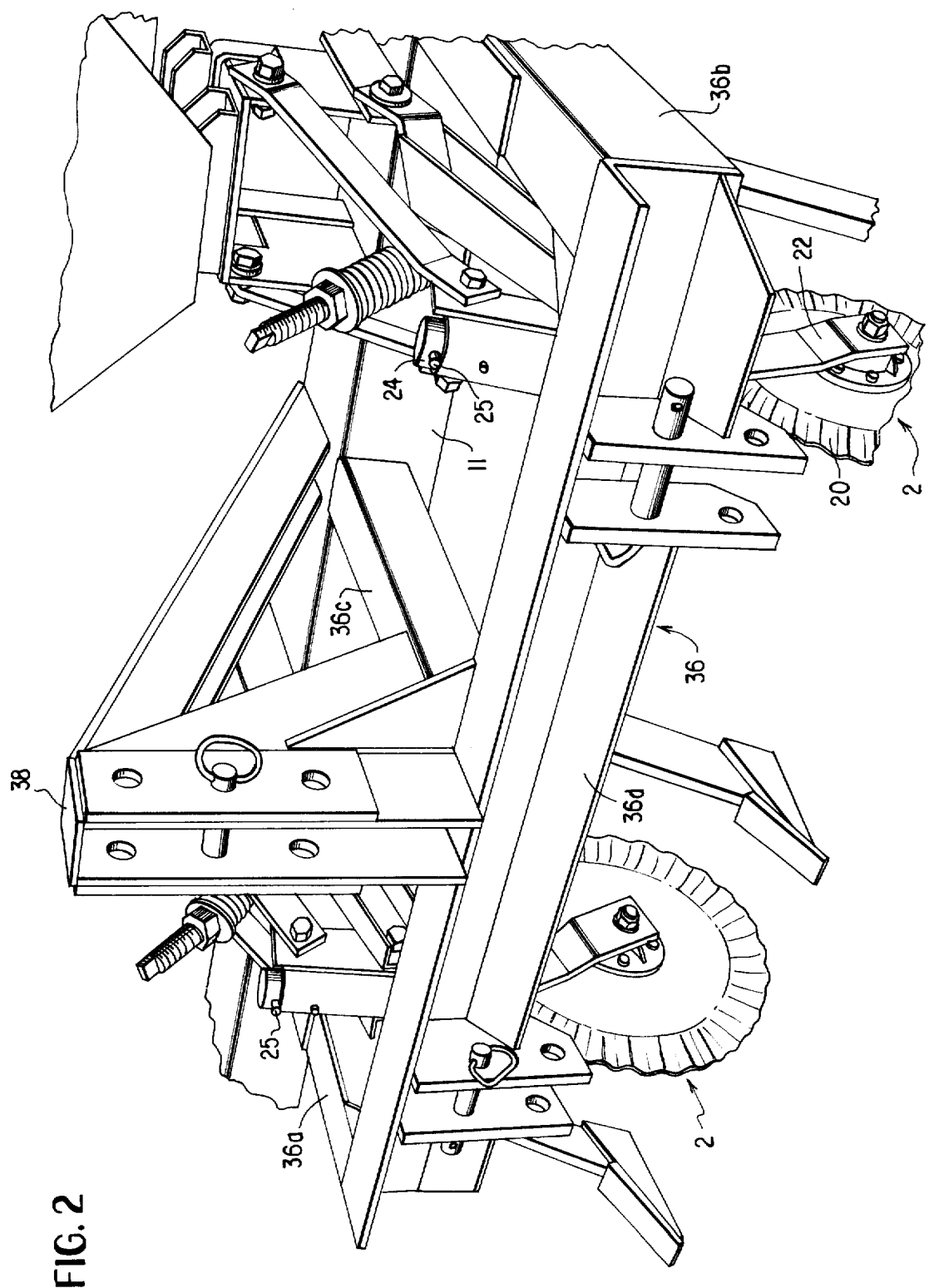
FIG. 2 shows a detail of the lift mount arrangement.
Figure 5:
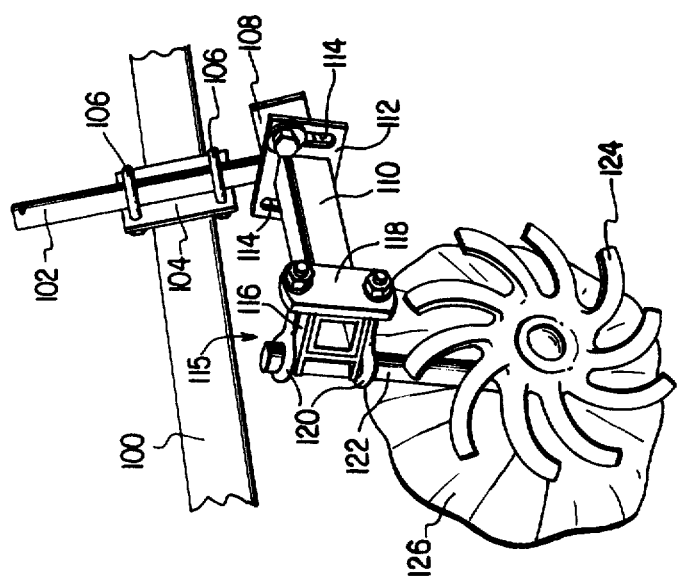
FIG. 5 shows a detail of the seed bed preparation implement assembly.
Figure 4:
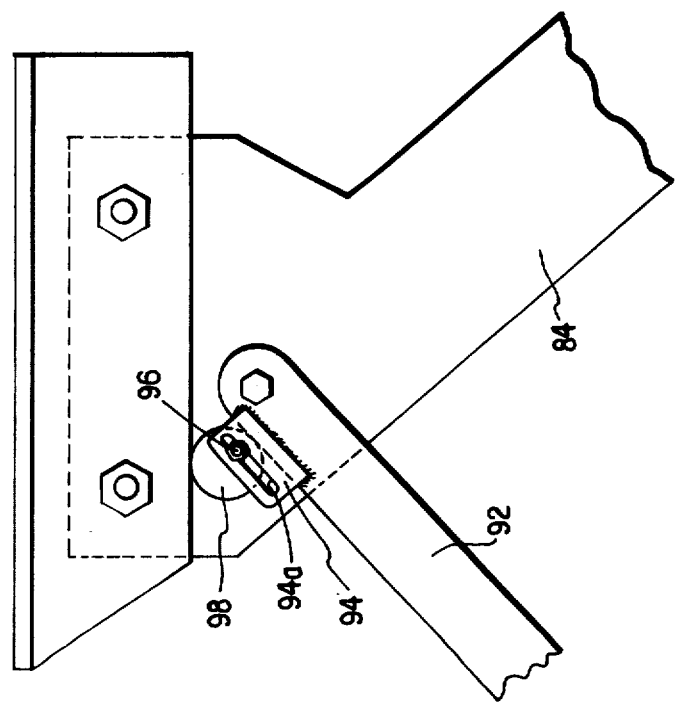
FIG. 4 shows a detail of the filler wheel arm stop mechanism.

As shown in FIG. 2, the lift mount bar 36 is a generally U-shaped member welded at the end of legs 36a and 36b to the box channel or rectangular tubular main tool bar 11 of main frame 10. A center leg 36c extends from main tool bar 11 to transverse leg 36d, being welded or otherwise securely affixed to both, and further supports an upright section 38 which provides, along with two locations on transverse leg 36d, three points for receiving the corresponding three connections of a standard three point tractor lift mount. It will be noted that two front coulter assemblies 2 are located within the U-shaped lift mount bar 36. This construction is sufficiently strong to support up to at least two outrigger rows on each side of the lift mount bar without requiring support from side transport wheels.

Depth adjustment and tension on the front coulter 20 are provided by a depth adjustment shaft 40 and tension spring 72. A shaft mounting block 44 having a smooth central axial bore 46 and radially extending threaded bores 48 is pivotally secured to block brackets 50, affixed to the frame 10. Block 44 is secured by mounting bolts 52 which pass through a bushing 54 in brackets 50, bolts 52 being threadably received in radial bores 48. One (preferably smooth) end portion of adjustment shaft 40 is slidably received in axial bore 46 and is secured against more than a minimal amount of axial play by a washer 56 welded or otherwise affixed to shaft 40 and a roll pin 58 received in a through hole in the end of shaft 40.

A depth adjusting nut 60 is received on the threaded portion of shaft 40. A wear sleeve 62 is fitted over at least a portion of the threaded part of shaft 40 above nut 60; sleeve 62 is slidable along shaft 40. A block 64 having a central axial bore 66 is slidably received over sleeve 62 and rests on nut 60. Sleeve 62 thus prevents wear on the threads of shaft 40 by axial movement of block 64. Block 64 contains radial threaded openings 68 similar to block 44. Block 64 is pivotably secured to lower mounting arms 32 by bolts 70, also in a similar manner to the mounting arrangement of block 44.

A spiral spring 72 fits over and around shaft 40; one end of spring 72 rests against the flat of block 64; the other end of spring 72 is pressed by a tension nut 76 through a washer 78. The upper end 40a of shaft 40 has a flat portion which may be gripped by a tool to permit rotation of the shaft 40. Depth adjusting nut 60 is held against rotation with shaft 40 by a pair of upstanding arms 80 which engage block 64 to prevent rotation of nut 60.

The arrangement of mounting block 44 provides a pivot axis about which shaft 40 can rotate as the front coulter assembly 2 moves up and down. Rotating shaft 40 causes nut 60 to move axially to adjust the maximum depth to which the front coulter 20 can penetrate the soil. Advantageously, coulter 20 may be adjustable for penetration depths of between about 1" and 8" or more and is essentially a function of soil conditions. Nut 76 provides a means for adjusting the tension on the front coulter assembly.

Figure 1:
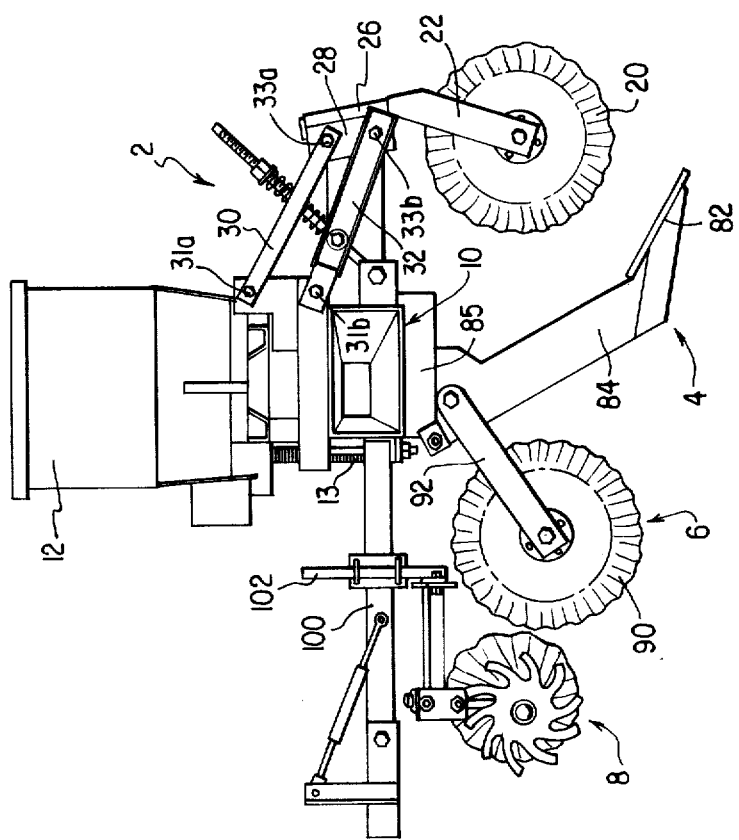
FIG. 1 is a side elevation of the subsoil breaking, surface soil conditioning apparatus of this invention.

Located behind the front coulter assembly 2 is the subsoiler assembly 4. This assembly comprises a subsoiler blade 82 integral with the distal end of shank 84. The proximal end of shank 84 is fixed to the main frame 10 by a conventional pivot pin and shear bolt arrangement. This is a standard breakaway mounting arrangement which causes the subsoiler assembly 4 to pivot rearwardly (in a clockwise direction in FIG. 1) in the event the blade 82 and/or shank 84 strikes an object such as a large underground rock or tree stump.

Preferably in operation, the subsoiler assembly 4 will penetrate to at least the depth of the "hard pan"; this would, on the average, be about 12 inches below the surface. The subsoiler depth is adjustable by conventional means, such as tires mounted to vertically adjustable axles coupled to the lateral ends of frame 10.

It is a feature of this invention that the front coulter 20 is fluted or waffle shaped. Such fluted coulters are available commercially and are described, for example, in Krumholz U.S. Pat. No. 3,701,327. Advantageously, the fluted coulter 20 is substantially wider than the subsoiler shank 84. Preferably, the ratio of the coulter width to the shank width ranges between about 1:1 and 2.5:1 or more. For example, the coulter 20 can have a width of about 1¾ inches and the subsoiler shank would be on the order of about 1 inch. It is a particularly advantageous feature of this invention that the coulter 20 churns up the soil and moves trash substantially laterally of the path to a greater width than the shank 84 so that the shank passes through a region of relatively trash-free soft soil and avoids the rolling out effect that the shank would otherwise have were it passing through firmer compacted soil. The rolling out effect, which is present in prior apparatus that do not employ a front coulter assembly, has a tendency to produce a deep furrow behind and to the sides of the shank which makes it harder to prepare a level seed bed, particularly for crops like soybean and cotton.

A primary feature of the front coulter 20 is that it prepares a practically trash free path that is wider than the subsoiler shank. This results in little or no trash collecting in front of the subsoiler to clog it, which could otherwise occur and would be particularly detrimental and disadvantageous when preparing long rows for the seed beds. The front coulter 20 also has an advantage in that it leaves more broken up soil in the area where it is available to the slot filler wheel assembly 6 to fill the slot created by the subsoiler assembly 4, as will be described in more detail below. Also by clearing a wider path, the front coulter 20 substantially reduces the amount of trash which might be carried into the slot by the filler wheel assembly 6.

The placement of the front coulter 20 relative to the subsoiler blade 82 is also an advantageous feature of this invention. Preferably, the center of coulter 20 (approximately coincident with its rotational axis) is located between 0 and about 4 inches forward of the point of the subsoiler blade 82. More preferably, the center of the coulter 20 is located slightly forward of the point of blade 82 and optimally about 1 inch forward of the point of blade 82; the measurement of the distance between the center of coulter 20 and the point of blade 82 is made when the lift mount bar 36 is in substantially a level position. The measurement is then made horizontally in the front to rear axial direction.

An advantage of this placement is that the forward half of the coulter 20 is in firm soil cutting trash and the rear portion of the coulter is running in softer dirt which has been disturbed by the subsoiler, thereby causing the soil to move in an upward direction. Generally, the soil in front of the coulter 20 is compacted and at a lower level than the soil behind the coulter. As the soil is raised by the subsoiler blade, which is generally flat topped having about a 2½ inch wide surface which forces the soil upwardly, at the same time loosening it, the rear portion of the coulter 20 is able to churn the loosened soil to thereby enable subsequent improvement in seed bed preparation. In addition, the trash is cut away by the coulter 20 in such a manner as to be pushed out of the way of the subsoiler shank. As noted above, the loosening of the soil behind the coulter 20 permits the subsoiler shank 86 to move through loosened soil rather than only through firm, hard, compacted soil.

The slot filler assembly 6 comprises a filler wheel 90 rotatably mounted on one end of a filler wheel arm 92. The other end of arm 92 is pivotally mounted by conventional means to the upper portion of subsoiler shank 84. The filler wheel 90 may advantageously be in the form of a fluted coulter similar to coulter 20 and having a diameter preferably at least about 20" or more. Alternatively, the filler wheel may comprise a tined wheel of the type shown in the U.S. Pat. No. 4,055,126. A fluted coulter filler wheel 90 is preferably dimensioned such that the width of the fluted coulter is greater than the width of the subsoiler shank; advantageously, the fluted coulter would have a width greater than the width of the subsoiler, and in one advantageous example, is preferably about 2 inches in width for a 1 inch wide subsoiler.

In essence, a primary requirement is that the coulter be wider than the slot being dug by the subsoiler so as to tear and cut the walls of the slot to fill the void left by the subsoiler shank, thereby effectively eliminating cave-in or natural settling of the soil. This aids in obtaining and keeping a plant population within a row to maximize per acre yield.

As noted above, the subsoiler penetrates to an average depth of about 12 inches in order to break up the subsurface "hard pan"; the filler wheel 90 is designed to extend to an average depth of about 10 inches below the surface. The filler wheel of this invention is thus intended to run deeper and is of a larger diameter than the standard rotary hoe one finds on common rotary hoe type implements (see, for example, Norris et al. U.S. Pat. No. 3,170,421). This enables the slot filler wheel to effectively and substantially fill the bottom portion of the slot dug by the subsoiler. This avoids air pockets or channels that would otherwise be left to encourage settling of the seed bed associated with conventional prior methods; in such prior methods, it often happens that a space is left beneath the prepared seed bed which often results in settling of the bed either by natural soil movement or after rains, etc. Such settling adversely affects crop growth in that it transports the seed to a depth at which it cannot effectively sprout or, with respect to already sprouted plants, has a tendency to expose the roots of the sprouts, causing them to dry out and kill the plant or stunt its growth.

Another advantageous function of the slot filler wheel of this invention is to thoroughly mix fertilizer in the seed bed; this prevents the fertilizer from lying in a band along the bottom of the seed bed which would tend to burn the roots of the plants. The rotary motion of the filler wheel tends to carry the fertilizer downward and distribute it evenly from top to bottom in the seed bed. Fertilizer is carried in the hopper 12 and travels downwardly (as controlled by a conventional metering system, through a flexible hose 13 which terminates over the line of the slot dug by the subsoiler assembly 4. The fertilizer hose outlet lies just behind the subsoiler shank 84 and in front of the slot filler wheel 90 and is positioned to drop the fertilizer directly into the slot prepared by the subsoiler. In a contemplated modification (not shown), a splitter is provided at the outlet of the hose 13 to spread a portion of the fertilizer off to the sides of the slot to reduce the amount of fertilizer being dropped directly into the seed bed.

The slot filler arm 92 is provided with an adjustable stop mechanism which limits upward movement of the slot filler wheel in operation. One example of such an adjustable stop is shown and comprises a plate 94 welded or otherwise securely affixed to the end portion of filler wheel arm 92 adjacent its point of pivotal attachment to subsoiler shank 84. The plate 94 contains an elongated slot 94a. A conventional bolt and washer arrangement 96 is passed through the slot 94a and is secured in an eccentrically located threaded opening in a short piece of cylindrical shaft 98. The location of the threaded opening in shaft 98 is such that when mounted in its operative arrangement, as shown, the periphery of shaft section 98 rests against the side of filler wheel arm 92. One of the features of this type of arrangement is that lateral movement of the shaft 96 within the slot 94a is inhibited by the binding force acting on the shaft as a function of the eccentric location of the threaded opening and mounting bolt 96. As the filler wheel arm 92 pivots upwardly, the periphery of shaft section 98 is forced against a bracket 85 to which the subsoiler shank is fastened, which bracket 85 is welded or otherwise securely affixed to the main machine frame 10.

A rearwardly extending flex bar 100 is pivotally attached to the main frame 10, e.g. through a bracket welded or otherwise securely affixed to channel member 11. A spring bias arrangement (not shown) may be advantageously provided between the flex arm 100 and frame 10 to exert a downward force to thereby cause the seed bed implement assembly 8 to make positive contact with the soil, as will be described in more detail below. Additional farming equipment, such as seed planters or the like may be conveniently attached to the distal end portions of flex arms 100 in known manner.

The seed bed implement assembly is mounted to the flex arm 100 to permit substantially universal adjustment capability of the soil working implements. A pair of seed bed preparation assemblies 8 are provided, one on each side of the flex arm 100; for convenience, since the assemblies are substantially identical, only one will be described below in detail.

Each seed bed preparation assembly 8 comprises a first, or main mounting shaft 102 which may be adjustably secured to a plate 104 by a pair of upper and lower U-bolts 106. A generally rectangular plate 108 is welded or otherwise securely affixed to the bottom of shaft 102 and is preferably provided with a pair of holes or substantially vertical slots (not shown). The U-bolts 106 press the shaft against friction grips (not shown) welded to the plate 104 to provide a mounting arrangement whereby the shaft 102 may be rotated about its vertical axis (i.e. substantially perpendicular to the longitudinal axis of flex arm 100, but called vertical for the same of convenience) and thereafter securely fixed in the desired rotated position.

A seed bed implement tool bar 100 has a generally rectangular plate 112 welded or otherwise securely affixed to one end. Plate 112 has a pair of slots 114 which match the holes or slots in plate 108. The tool bar 110 may be adjustably secured to the shaft 102 by conventional bolt and nut means which pass through the matching holes or slots in the plates 108 and 114. This arrangement permits the tool bar 110 to be rotated about its longitudinal axis (substantially perpendicular to the rotational axis of shaft 102). Advantageously, the slots 114 are dimensioned to permit rotation of the tool bar 110 through an arc of about 90°, or about 45° to the left and right of center. A slidably adjustable mounting assembly 115 is provided for mounting the earth working implements to the tool bar 110. In one embodiment, this mounting assembly comprises an H-shaped member 116, an end plate 118 and a pair of eye bolts 120. The eye bolts 120 are located on each side of the H-member and pass through openings in the plate 118. A second, or implement mounting shaft 122 passes through the eyes of bolts 120 and rests in part circular cutouts in the legs of H member 116. When the nuts on the ends of the eye bolts 120 are loosened, the entire mounting assembly 115 is adjustable axially along tool bar 110 and shaft 122 is adjustable axially and rotationally about its longitudinal axis (substantially perpendicular to the longitudinal axis of tool bar 110). Tightening the nuts on bolts 120 secures the mounting assembly 115 in its desired position on tool bar 110 and secures the shaft 122 against further rotation or axial movement.

Clearly the present invention is not intended to be limited by the particular detailed construction shown and described for the seed bed preparation assembly 8. It is a feature of this invention that the working tools are substantially universally adjustable relative to each other and to the ground for reasons which will become apparent below.

At the end portion located away from the mounting assembly 115, shaft 122 carries an axle housing and axle mounting a spider 124 and a fluted coulter 126 for rotation about an axis substantially perpendicular to the axis of shaft 122. Although this arrangement is presently the preferred embodiment, it is contemplated that alternate constructions eliminating the spider 124 or mounting a second fluted coulter in place of spider 124 could and may be used to advantage.

In the present construction, employing the combination of the spider 124 and fluted coulter 126, it is preferred that the coulter 126 be of a larger diameter than the spider. Advantageously, the relationship between the spider diameter and the coulter diameter is in the range between approximately 1:1.0 and 1:1.5, and preferably 1:1.17. In the disclosed embodiment, the spider is 12 inches in diameter and the coulter is 14 inches in diameter.

By adjusting the assembly 8 such that the spider 124 is on the outside (i.e. displaced laterally further away from the center of the slot than the coulter 126) the spider will dig into firmer dirt and will impart a spinning action to the coulter 126 causing it to travel faster than ground speed due primarily to the difference in the diameter between the two implements and the fact that the coulter is traveling through less firm (i.e. more preworked) soil. Preferably, the spider is shaped such that the arc of the fingers thereof extend in a direction opposite the direction of travel of the entire apparatus so as to grip the soil firmly in a positive manner. This provides additional traction to the spider, forcing the coulter to travel at a higher rate of speed than ground speed. In this invention, adjacent fingers of the spider 124 are angled outwardly in opposite directions away from the central axial plane to provide additional gripping power as compared to a spider in which the fingers are all axially aligned.

It is also to be noted that the seed bed preparation assemblies 8 are mounted to the outside of the flex bar 100. This leaves a space between the pairs of assemblies 8. Thus, in the event the subsoiler hits a submerged object which causes the shear bolt to break, the subsoiler shank and slot filler wheel can pass upwardly in the space between the seed bed implements without hitting and thus damaging the implements. This has enabled the entire apparatus to be shortened by up to 8 inches or more as compared to the apparatus shown in the U.S. Pat. No. 4,055,126. The prior arrangement shown in the U.S. Pat. No. 4,055,126 required the seed bed implement assembly 8 to be placed further back on the flex arm to allow room for the subsoiler shank to trip without hitting and damaging the seed bed implements. This shortening of the rear portion of the apparatus is an additional factor which has enabled implementation of the four row and six row lift type constructions.

Prior seed bed preparation implement constructions had a tendency to throw trash on the bed and then throw dirt or soil on top of the trash; this resulted in a layer of trash where the seed should be allowed to germinate, thereby creating substantial air pockets or channels which are detrimental to seed sprouting. Further, prior constructions moved a smaller percentage of dirt and therefore one had to use wider angles on the implements to level the seed bed by covering a wider soil area; as a result, more trash was encountered which was also dumped onto the seed bed and was detrimental to seed germination.

By running coulter 126 in the softer dirt faster than ground speed, it is able to pulverize the soil significantly better than previously used rotary hoes. The wide fluted edges of the coulter will cut the clods and lift the soil, resulting in the pulverizing and churning action. By doing this, fewer air pockets or channels result which would have a tendency otherwise to dry out the seed or the soil around the seed, thereby decreasing germination and/or sprouting efficiency.

It will also be noted that each assembly 8 is independently adjustable, thus permitting the right side assembly to be offset longitudinally from the left side (and vice versa). By adjusting the assemblies 8 in this manner, the offset prevents clogging of the seed bed preparation implements by soil and/or trash thrown onto the bed by the coulters 126.

Further, the solid shape of the coulters 126 provide more surface area for effectively moving the soil than the open finger arrangement of spiders 124. In addition, the wide flutes of the coulters 126 cause a large portion of the trash remaining in the bed behind the slot filler assembly to be lifted and carried upward and outward of the seed bed area by the rear portion of the coulters; trash brought into the bed by the front portions of coulters 126 along with soil is similarly removed by the rear portions of the coulters in their upward motion.

OPERATION

The wide fluted front coulter 20 prepares a practically trash free path in front of the subsoiler shank 84. The coulter 20 breaks up the compacted top soil in front of the subsoiler shank at the same time that it breaks up the surface trash or mulch and throws it off to the side. This enables the subsoiler shank to pass through a relatively soft soil region which is wider than the shank width; this essentially prevents the soil from rolling up against the front and sides of the shank and also prevents trash from wrapping around the subsoiler shank. In prior systems using subsoilers under no-till conditions, trash would collect around the shank; the collected trash would itself create furrows which, if not repaired, would create drainage run off ditches causing soil around the seed bed to wash away. Such furrows could only be repaired by manual efforts or by additional equipment and additional passes across the field.

The subsoiler traveling below and behind the front coulter breaks up the hard pan beneath the surface and at the same time lifts the dirt against the rear portion of the coulter 20 to achieve additional pulverization and trash removal of the soil.

The wide fluted or tined soft filler wheel 90 tears and cuts the walls of the slot made by the subsoiler assembly 4 to fill the void left by the subsoiler with broken up dirt. Because the filler wheel is designed to run relatively deep in the slot, it fills the slot substantially to the bottom with broken up soil, thereby substantially eliminating the threat of cave-ins or natural settling. In conventional planting methods in which subsoilers have been used, it was necessary to plant seeds approximately two inches to the side of the slot to compensate for the effects of cave-in and to prevent the seed from being carried too deep to properly germinate and sprout or to prevent root exposure of the growing plants. Under such prior methods, it was not possible to plant in trash without prior tilling, a substantial disadvantage in terms of soil conservation and more efficient utilization of natural resources, such as moisture retention.

After the slot has been filled by the slot filler assembly 6, the seed bed preparation assembly 8 further pulverizes the top soil. This is effectively accomplished by the fluted coulters 126 which rotate faster than the ground speed to create a churning action within the top soil of the filled in slot. The bed is now ready to receive the seed.

In some areas of the country, for example, in parts of Tennessee, the soil is of a type which does not readily compact, thus "hard pan" is not created to the same detrimental extent as in other areas. In such conditions, it is not necessary to employ the subsoiler and slot filler assemblies; adequate seed bed preparation can be achieved through an apparatus incorporating the front coulter assembly 2 and seed bed preparation assembly 8 alone.

The invention may be enbodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. Soil preparing and conditioning apparatus, comprising:
   a main frame,
   soil loosening means coupled to the main frame for cutting and loosening compacted soil along a relatively narrow track, including:
      a rotatable cutting member, cutter mounting means for mounting said rotatable cutting member to said frame for pivotable movement of said cutting member about a generally upright axis relative to the ground plane, and
      means coupling said cutter mounting means to said main frame for pivotal movement of said cutter mounting means and said rotatable cutting member toward and away from the ground through an arc whose center of curvature lies forward of said mounting means in a direction away from said main frame;
   subsoiler means coupled to said main frame behind and in substantial axial alignment with said soil loosening means for breaking and shattering hard pan beneath the surface of the ground;
   slot filler means coupled to said main frame behind and in substantial axial alignment with said subsoiler means for filling a slot in the soil left by the forward motion of said subsoiler means therethrough; and
   seed bed preparation means coupled to said main frame behind said slot filler means for pulverizing the soil in and adjacent the region of the filled in slot behind the slot filler means, said seed bed preparation means including:
      soil chopping means, and
      means mounting said soil chopping means to said main frame for substantially universal axial, angular and lateral adjustment relative to said filled in slot.

2. Apparatus according to claim 1, wherein said means coupling said cutter mounting means to said main frame includes:
   first and second linkage members independently pivotably connected at one end to said main frame and independently pivotably connected to said cutter mounting means at their axially opposite ends.

3. Apparatus according to claim 2, wherein:
   the distance between the axially opposite pivot points of said first linkage member is less than the distance between the axially opposite pivot points of said second linkage member; and
   the distance between the pivot points connecting the first and second linkage members to the main frame is greater than the distance between the pivot points connecting the first and second linkage members to the cutter mounting means.

4. Apparatus according to claim 3, wherein said rotatable cutting member comprises a fluted coulter having a width equal to or greater than the width of the subsoiler means.

5. Apparatus according to claim 3, wherein said soil loosening means further comprises:
   depth adjustment means for adjusting the maximum permissible amount of downward vertical travel of the rotatable cutting member, including a threaded shaft pivotably coupled at one end to the main frame, and further means coupling said threaded shaft to said second linkage member for axial and pivotal relative movement therebetween.

6. Apparatus according to claim 5, wherein said soil loosening means further comprises:
tension adjustment means comprising spring means located coaxially around said threaded shaft and coacting between said shaft and said further coupling means for biasing said rotatable cutting member in a generally downward direction.

7. Apparatus according to claim 1, wherein said subsoiler means includes:
a downwardly extending shank fastened at its proximal end portion to said main frame behind and in substantial axial alignment with said rotatable cutting member;
said shank having a blade at its distal end portion, said blade being so shaped to break up the hard pan and force loosened soil upward behind the front portion of the cutting member and against the rear portion of the cutting member.

8. Apparatus according to claim 7, wherein said rotatable cutting member comprises a fluted coulter having a width equal to or greater than the width of said shank.

9. Apparatus according to claim 8, wherein the rotational axis of said coulter lies between 0 and 4 inches forward of the front edge of said blade in a horizontal direction.

10. Apparatus according to claim 9, wherein the rotational axis of said coulter lies approximately 1 inch forward of the front edge of said blade.

11. Apparatus according to claim 7, wherein said slot filler means includes:
an elongated arm pivotably coupled at one end to said subsoiler shank; and
a rotatable slot filler member mounted to the other end of said elongated arm behind and substantially axially aligned with said subsoiler shank, said rotatable slot filler member having means for tearing soil from the walls of the slot formed by the subsoiler shank and for urging the torn soil downwardly toward the bottom of the slot so formed to substantially reduce air pockets or channels in the bottom portion of the slot.

12. Apparatus according to claim 11, wherein said rotatable slot filler member comprises a fluted coulter having a width equal to or greater than the width of said subsoiler shank.

13. Apparatus according to claim 11, further comprising:
an adjustable stop means coupled to said slot filler means for adjusting the maximum permissible upward travel of the rotatable slot filler member, including:
a slotted plate fixed to said elongated arm,
a cylindrical member having an eccentric bore therein, and means for adjustably securing the cylindrical member to the arm through the slotted plate such that a first peripheral portion of the cylindrical member rests against an edge portion of the arm and a second peripheral portion of the cylindrical member is engageable with said frame.

14. Apparatus according to claim 1, wherein said slot filler means includes:
an elongated arm pivotably coupled at one end to said subsoiler shank; and
a rotatable slot filler member mounted to the other end of said elongated arm behind and substantially axially aligned with said subsoiler shank, said rotatable slot filler member having means for tearing soil from the walls of the slot formed by the subsoiler shank and for urging the torn soil downwardly toward the bottom of the slot so formed to substantially reduce air pockets or channels in the bottom portion of the slot.

15. Apparatus according to claim 14, wherein said rotatable slot filler member comprises a fluted coulter having a width equal to or greater than the width of said subsoiler shank.

16. Apparatus according to claim 14, further comprising:
adjustable stop means coupled to said slot filler means for adjusting the maximum permissible upward travel of the rotatable slot filler member.

17. Apparatus according to claim 16, wherein said adjustable stop means comprises:
a slotted plate fixed to said elongated arm;
a cylindrical member having an eccentric bore therein; and
means for adjustably securing the cylindrical member to the arm through the slotted plate such that a first peripheral portion of the cylindrical member rests against an edge portion of the arm and a second peripheral portion of the cylindrical member is engageable with said main frame.

18. Apparatus according to claim 1, wherein said seed bed preparation means further comprises:
a rearwardly axially extending flex member flexibly mounted to said main frame;
an assembly mounting shaft mounted to said flex member for rotation about an axis substantially perpendicular to the longitudinal axis of the flex member;
means for adjustably securing the assembly mounting shaft against rotational movement relative to said flex member;
a tool bar coupled to said assembly mounting shaft for rotational movement therewith and for pivotal movement about an axis substantially perpendicular to the rotational axis of said assembly mounting shaft;
an implement mounting shaft;
means mounting said implement mounting shaft to said tool bar for adjustable axial movement therealong and for rotational movement about an axis substantially perpendicular to the pivot axis of the tool bar; and
means mounting said soil chopping means to said implement mounting shaft for rotation about an axis substantially perpendicular to the rotational axis of said implement mounting shaft, said soil chopping means including:
a fluted coulter,
a spider mounted on a common axle with said fluted coulter and having a diameter less than the diameter of the fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

19. Apparatus according to claim 1, wherein said soil chopping means further includes:

first and second rotatable members mounted adjacent each other on a common axis, said first member having a smaller diameter than said second member for driving said second member at a peripheral rotational speed greater than the forward speed of the soil chopping means relative to the ground.

20. Apparatus according to claim 19, wherein:

one of said first and second rotatable members comprises a fluted coulter and the other of said first and second rotatable members comprises a spider mounted on a common axle with the coulter and having a diameter less than the diameter of the fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

21. Apparatus according to claim 18, wherein said soil chopping means is provided in duplicate on opposite lateral sides of said flexible member for straddling the slot behind the slot filler means.

22. Apparatus according to claim 1, wherein said seed bed preparation mqans is provided in duplicate behind and on opposite lateral sides of said slot filler means for substantially universal adjustment relative to said filled in slot.

23. Soil conditioning apparatus comprising:

a main frame;

soil loosening means for cutting and loosening compacted soil ahead of the frame, including:
a rotatable cutting member,
means mounting said rotatable cutting member to said frame for pivotable movement of said cutting member about a generally upright axis relative to the ground plane, and
means coupling said cutter mounting means to said main frame for pivotal movement of said cutter mounting means and said rotatable cutter means toward and away from the ground through an arc whose center lies forward of said mounting means in a direction away from said main frame;

subsoiler means coupled to said main frame for breaking and shattering hard pan beneath the surface of the ground;

and seed bed preparation means for pulverizing the soil in and adjacent the region behind the subsoiler means, including: soil chopping means, and means mounting said soil chopping means to said main frame for substantially universal adjustment axially, angularly and laterally relative to the soil region behind the subsoiler means.

24. Apparatus according to claim 23, wherein said means coupling said cutter mounting means to said main frame includes:

first and second linkage members independently pivotably connected at one end to said main frame and independently pivotably connected to said cutter mounting means at their axially opposite ends.

25. Apparatus according to claim 24, wherein:

the distance between the axially opposite pivot points of said first linkage member is less than the distance between the axially opposite pivot points of said second linkage member; and the distance between the pivot points connecting the first and second linkage members to the main frame is greater than the distance between the pivot points connecting the first and second linkage members to the cutter mounting means.

26. Apparatus according to claim 25, wherein said rotatable cutting member comprises a fluted coulter having a width equal to or greater than the width of said subsoiler means.

27. Apparatus according to claim 23, wherein said subsoiler means includes:

a downwardly extending shank fastened at its proximal end portion to said main frame behind and in substantial axial alignment with said rotatable cutting member;

said shank having a blade at its distal end portion, said blade being so shaped to break up the hard pan and force loosened soil upward behind the front portion of the cutting member and against the rear portion of the cutting member.

28. Apparatus according to claim 27, wherein said rotatable cutting member comprises a fluted coulter having a width equal to or greater than the width of said shank.

29. Apparatus according to claim 28, wherein the rotational axis of said coulter lies between 0 to 4 inches forward of the front edge of said blade in a horizontal direction.

30. Apparatus according to claim 29, wherein the rotational axis of said coulter lies approximately 1 inch forward of the front edge of said blade.

31. Apparatus according to claim 23, wherein said soil chopping means comprises:

at least one rotatable chopping member; and
means for rotating said at least one rotatable chopping member at a greater peripheral angular velocity than the forward speed of the seed bed preparation means relative to the ground.

32. Apparatus according to claim 23, wherein said soil chopping means comprises:

first and second rotatable members mounted adjacent each other on a common axis, said first member having a smaller diameter than said second member for driving said second member at a peripheral rotational speed greater than the forward speed of the seed bed preparation means relative to the ground.

33. Apparatus according to claim 32, wherein:

one of said first and second rotatable members comprises a fluted coulter and the other of said first and second rotatable members comprises a spider mounted on a common axle with the coulter and having a diameter less than the diameter of the fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

34. Apparatus according to claim 33, wherein said seed bed preparation means is provided in duplicate behind and on opposite lateral sides of said subsoiler means for substantially universal adjustment relative to the soil region behind the subsoiler means.

35. Soil conditioning apparatus, comprising:

a main frame;
soil loosening means coupled to said main frame for cutting and loosening compacted soil along a relatively narrow track, including:
a rotatable cutting member,
means mounting said rotatable cutting member to said frame for pivotable movement of said cutting member about a generally upright axis relative to the ground plane, and
means coupling said cutter mounting means to said main frame for pivotal movement of said cutter mounting means and said rotatable cutter means toward and away from the ground through an arc whose center of curvature lies forward of said mounting means in a direction away from the main frame;
subsoiler means coupled to said main frame for breaking and shattering hard pan beneath the surface; and
slot filler means coupled to said main frame for filling a slot in the soil left by the forward motion of said subsoiler means therethrough.

36. Apparatus according to claim 35, wherein said means coupling said cutter mounting means to said main frame includes:
first and second linkage members independently pivotably connected at one end to said main frame and independently pivotably connected to said cutter mounting means at their axially opposite ends.

37. Apparatus according to claim 36, wherein:
the distance between the axially opposite pivot points of said first linkage member is less than the distance between the axially opposite pivot points of said second linkage member; and
the distance between the pivot points connecting the first and second linkage members to the main frame is greater than the distance between the pivot points connecting the first and second linkage members to the cutter mounting means.

38. Apparatus according to claim 37, wherein said rotatable cutting member comprises a fluted coulter having a width equal to or greater than the width of said subsoiler means.

39. Apparatus according to claim 37, wherein said soil loosening means further comprises:
depth adjustment means for adjusting the maximum permissible amount of downward vertical travel of the rotatable cutting member, including a threaded shaft pivotably coupled at one end to the main frame, and further means coupling said threaded shaft to said second linkage member for axial and pivotal relative movement therebetween.

40. Apparatus according to claim 39, wherein said soil loosening means further comprises:
tension adjustment means comprising spring means located coaxially around said threaded shaft and coacting between said shaft and said further coupling means for biasing said rotatable cutting member in a generally downward direction.

41. Apparatus according to claim 35, wherein said subsoiler means includes:
a downwardly extending shank fastened at its proximal end portion to said main frame behind and in substantial axial alignment with said rotatable cutting member;
said shank having a blade at its distal end portion, said blade being so shaped to break up the hard pan and force loosened soil upward behind the front portion of the cutting member and against the rear portion of the cutting member.

42. Apparatus according to claim 41, wherein said rotatable cutting member comprises a fluted coulter having a width equal to or greater than the width of said shank.

43. Apparatus according to claim 42, wherein the rotational axis of said coulter lies between 0 and 4 inches forward of the front edge of said blade in a horizontal direction.

44. Apparatus according to claim 43, wherein the rotational axis of said coulter lies approximately 1 inch forward of the front edge of said blade.

45. Apparatus according to claim 41, wherein said slot filler means includes:
an elongated arm pivotally coupled at one end to said subsoiler shank; and
a rotatable slot filler member mounted to the other end of said elongated arm behind and substantially axially aligned with said subsoiler shank, said rotatable slot filler member having means for tearing soil from the walls of the slot formed by the subsoiler shank and for urging the torn soil downwardly toward the bottom of the slot so formed to substantially reduce air pockets or channels in the bottom portion of the slot.

46. Apparatus according to claim 45, wherein said rotatable slot filler member comprises a fluted coulter having a width equal to or greater than the width of said subsoiler shank.

47. Apparatus according to claim 45, further comprising:
an adjustable stop means coupled to aid slot filler means for adjusting the maximum permissible upward travel of the rotatable slot filler member, including:
a sloted plate fixed to said elongated arm,
a cylindrical member having an eccentric bore therein, and
means for adjustably securing the cylindrical member to the arm through the slotted plate such that a first peripheral portion of the cylindrical member rests against an edge portion of the arm and a second peripheral portion of the cylindrical member is engageable with said frame.

48. Apparatus according to claim 35, wherein said slot filler means includes:
an elongated arm pivotally coupled at one end to said subsoiler shank; and
a rotatable slot filler member mounted to the other end of said elongated arm behind and substantially axially aligned with said subsoiler shank, said rotatable slot filler member having means for tearing soil from the walls of the slot formed by the subsoiler shank and for urging the torn soil downwardly toward the bottom of the slot so formed to substantially reduce air pockets or channels in the bottom portion of the slot.

49. Apparatus according to claim 48, wherein said rotatable slot filler member comprises a fluted coulter having a width equal to or greater than the width of said subsoiler shank.

50. Apparatus according to claim 48, further comprising:
adjustable stop means coupled to said slot filler means for adjusting the maximum permissible upward travel of the rotatable slot filler member.

51. Apparatus according to claim 50, wherein said adjustable stop means comprises:
a slotted plate fixed to said elongated arm;
a cylindrical member having an eccentric bore therein; and
means for adjustably securing the cylindrical member to the arm through the slotted plate such that a first peripheral portion of the cylindrical member rests against an edge portion of the arm and a second peripheral portion of the cylindrical member is engageable with said main frame.

52. Soil conditioning apparatus, comprising:
a main frame;
soil loosening means coupled to said main frame for cutting and loosening compacted soil along a relatively narrow track, including:
a rotatable cutting member,
means mounting said rotatable cutting member to said frame for pivotal movement of said cutting member about a generally upright axis relative to the ground plane, and
means coupling said cutter mounting means to said main frame for pivotal movement of said cutter mounting means and said rotatable cutter means toward and away from the ground through an arc whose center of curvature lies forward of said mounting means in a direction away from the main frame; and
subsoiler means for breaking and shattering hard pan beneath the surface.

53. Apparatus according to claim 52, wherein said means coupling said cutter mounting means to said main frame includes:
first and second linkage members independently pivotably connected at one end to said main frame and independently pivotably connected to said cutter mounting means at their axially opposite ends.

54. Apparatus according to claim 53, wherein:
the distance between the axially opposite pivot points of said first linkage member is less than the distance between the axially opposite pivot points of said second linkage member; and
the distance between the pivot points connecting the first and second linkage members to the main frame is greater than the distance between the pivot points connecting the first and second linkage members to the cutter mounting means.

55. Apparatus according to claim 53, wherein said rotatable cutting member comprises a fluted coulter having a width equal to or greater than the width of said subsoiler means.

56. Apparatus according to claim 54, wherein said soil loosening means further comprises:
depth adjustment means for adjusting the maximum permissible amount of downward vertical travel of the rotatable cutting member, including a threaded shaft pivotally coupled at one end to the main frame, and further means coupling said threaded shaft to said second linkage member for axial and pivotal relative movement therebetween.

57. Apparatus according to claim 56, wherein said soil loosening means further comprises:
tension adjustment means comprising spring means located coaxially around said threaded shaft and coacting between said shaft and said further coupling means for biasing said rotatable cutting member in a generally downward direction.

58. Apparatus according to claim 52, wherein said subsoiler means includes:
a downwardly extending shank fastened at its proximal end portion to said main frame behind and in substantial axial alignment with said rotatable cutting member;
said shank having a blade at its distal end portion, said blade being so shaped to break up the hard pan and force loosened soil upward behind the front portion of the cutting member and against the rear portion of the cutting member.

59. Apparatus according to claim 55, wherein the rotational axis of said coulter lies between 0 and 4 inches forward of the front edge of said blade in a horizontal direction.

60. Apparatus according to claim 59, wherein the rotational axis of said coulter lies approximately 1 inch forward of the front edge of said blade.

61. Soil conditioning apparatus, comprising:
a main frame;
soil loosening means for cutting and loosening compacted soil ahead of the apparatus, including:
a rotatable cutting member, a mounting member for mounting the rotatable cutting member for pivotal movement about a generally upright axis,
first and second linkage members independently pivotably connected at one end to said main frame and independently pivotably connected to said mounting member at their axially opposite ends,
wherein the distance between the axially opposite pivot points of said first linkage member is less than the distance between the axially opposite pivot points of said second linkage member, and
wherein the distance between the pivot points connecting the first and second linkage members to the main frame is greater than the distance between the pivot points connecting the first and second linkage members to the mounting member;
subsoiler means for breaking and shattering hard pan beneath the surface, including:
a downward extending shank fastened to said main frame behind and in substantial axial alignment with said rotatable cutting member,
said shank having a blade so shaped to break up the hard pan and force loosened soil upward behind the front portion of the rotatable cutting member;
slot filler means for filling a slot in the soil left by the forward motion of said subsoiler means therethrough, said slot filler means including:
an elongated arm pivotably coupled at one end to said subsoiler shank, and
a rotatable slot filler member mounted to the other end of said elongated arm behind and substantially axially aligned with said subsoiler shank, said rotatable slot filler member having means for tearing soil from the walls of the slot formed by the subsoiler shank and for urging the torn soil downward toward the bottom of the slot to substantially reduce air pockets or channels on the bottom portion of the slot; and
seed bed preparation means for pulverizing the soil in and adjacent the region of the filled in slot behind the slot filler means, including:
soil chopping means comprising first and second rotatable soil chopping members mounted adjacent each other on a common axle, said first soil chopping member having a smaller diameter than said second soil chopping member for driving said second soil chopping member at a peripheral rotational speed greater than the forward speed of said apparatus relative to the ground, and means mounting said soil chopping means to said main frame for substantially universal adjustment axially, angularly and laterally relative to the filled in slot behind said slot filler means.

62. Apparatus according to claim 61, wherein said rotatable cutting member comprises a fluted coulter having a width equal to or greater than the width of said shank.

63. Apparatus according to claim 62, wherein the rotational axis of said coulter lies between 0 and 4 inches forward of the front edge of said blade in a horizontal direction.

64. Apparatus according to claim 63, wherein the rotational axis of said coulter lies approximately 1 inch forward of the front edge of said blade.

65. Apparatus according to claim 62, wherein said rotatable slot filler member comprises a fluted coulter having a width equal to or greater than the width of said subsoiler shank.

66. Apparatus according to claim 61, further comprising:

adjustable stop means coupled to said slot filler means for adjusting the maximum permissible upward travel of the rotatable slot filler member.

67. Apparatus according to claim 61, wherein:

one of said first and second rotatable members comprises a fluted coulter and the other of said first and second rotatable members comprises a spider mounted on a common axle with the coulter and having a diameter less than the diameter of the fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

68. Apparatus according to claim 67, wherein said seed bed preparation means is provided in duplicate behind and on opposite lateral sides of said slot filler means for substantially universal adjustment relative to said filled in slot.

69. Apparatus according to claim 61, wherein said seed bed preparation means further comprises:

a rearwardly axially extending flex member flexibly mounted to said main frame;

an assembly mounting shaft mounted to said flex member for rotation about an axis substantially perpendicular to the longitudinal axis of the flex member;

means for adjustably securing the assembly mounting shaft against rotational movement relative to said flex member;

a tool bar coupled to said assembly mounting shaft for rotational movement therewith and for pivotal movement about an axis substantially perpendicular to the rotational axis of said assembly mounting shaft;

an implement mounting shaft;

means mounting said implement mounting shaft to said tool bar for adjustable axial movement therealong and for rotational movement about an axis substantially perpendicular to the pivot axis of the tool bar; and axle means mounted to said implement mounting shaft for rotation about an axis substantially perpendicular to the rotational axis of said implement mounting shaft;

wherein:

said second rotatable soil chopping member comprises a fluted coulter mounted to said axle means; and said first rotatable soil chopping member comprises a spider mounted on said axle means with said fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

70. Apparatus according to claim 61, wherein said soil chopping means is provided in duplicate on opposite lateral sides of said means mounting said soil chopping means to said main frame.

71. Soil preparing and conditioning apparatus, comprising:

a main frame;

soil loosening means coupled to said main frame for cutting and loosening compacted soil along a relatively narrow track, including:

a rotatable cutting member, means mounting said rotatable cutting member to said frame for pivotable movement of said cutting member about a generally upright axis relative to the ground plane, and means coupling said cutter mounting means to said main frame for pivotal movement of said cutter mounting means and said rotatable cutter means toward and away from the ground through an arc whose center of curvature lies forward of said mounting means in a direction away from said main frame; and seed bed preparation means coupled to said main frame behind said soil breaking means for pulverizing the soil in and adjacent the region of the track of loosened soil behind the soil loosening means, said seed bed preparation means including:

soil chopping means, and means mounting said soil chopping means to said main frame for substantially universal axial, angular and lateral adjustment relative to the ground plane in the region of the track of loosened soil.

72. Apparatus according to claim 72, wherein said means coupling said cutter mounting means to said main frame includes:

first and second linkage members independently pivotably connected at tone end to said main frame and independently pivotably connected to said cutter mounting means at their axially opposite ends.

73. Apparatus according to claim 72, wherein:

the distance between the axially opposite pivot points of said first linkage member is less than the distance between the axially opposite pivot points of said second linkage member; and the distance between the pivot points connecting the first and second linkage members to the main frame is greater than the distance between the pivot points connecting the first and second linkage members to the cutter mounting means.

74. Apparatus according to claim 73, wherein said rotatable cutting member comprises a fluted coulter.

75. Apparatus according to claim 71, wherein said soil chopping means comprises:

at least one rotatable chopping member; and means for rotating said at least one rotatable chopping member at a greater peripheral angular velocity than the forward speed of the seed bed preparation means relative to the ground.

76. Apparatus according to claim 71, wherein said soil chopping means comprises:

first and second rotatable members mounted adjacent each other on a common axis, said first member having a smaller diameter than said second member for driving said second member at a peripheral rotational speed greater than the forward speed of the seed bed preparation means relative to the ground.

77. Apparatus according to claim 76, wherein:

one of said first and second rotatable members comprises a fluted coulter and the other of said first and second rotatable members comprises a spider mounted on a common axle with the coulter and having a diameter less than the diameter of the fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

78. Apparatus according to claim 77, wherein said seed bed preparation means is provided in duplicate behind and on opposite lateral aides of said soil loosening means for substantially universal adjustment relative to the ground plane in the region of the tract of loosened soil.

79. Apparatus according to claim 76, wherein said seed bed preparation means further comprises:

a rearwardly axially extending flex member flexibly mounted to said main frame;

an assembly mounting shaft mounted to said flex member for rotation about an axis substantially perpendicular to the longitudinal axis of the flex member;

means for adjustably securing the assembly mounting shaft against rotational movement relative to said flex member;

a tool bar coupled to said assembly mounting shaft for rotational movement therewith and for pivotal movement about an axis substantially perpendicular to the rotational axis of said assembly mounting shaft;

an implement mounting shaft;

means mounting said implement mounting shaft to said tool bar for adjustable axial movement therealong and for rotational movement about an axis substantially perpendicular to the pivot axis of the tool bar; and axle means mounted to said implement mounting shaft for rotation about an axis substantially perpendicular to the rotational axis of said implement mounting shaft;

wherein:

said second rotatable soil chopping member comprises a fluted coulter mounted to said axle means; and said first rotatable soil chopping member comprises a spider mounted on said axle means with said fluted coulter, the fingers of the spider being arranged to positively contact the soil to thereby impart a rotational motion to the coulter when the apparatus is moving in a forward direction, the peripheral rotational speed of the coulter being greater than the forward speed of the seed bed preparation means, whereby said coulter substantially pulverizes the soil in the region of the seed bed behind the slot filler means.

80. Apparatus according to claim 71, wherein said soil chopping means comprises first and second rotatable members having diameters in a ratio range between about 1:1 and 1:1.5.

81. Apparatus according to claim 1, wherein said soil chopping means comprises first and second rotatable members having diameters in a ratio range between about 1:1 and 1:1.5.

82. Apparatus according to claim 31, wherein said soil chopping means comprises first and second rotatable members having diameters in a ratio range between about 1:1 and 1:1.5.

83. Apparatus according to claim 75, wherein said soil chopping means comprises first and second rotatable members having diameters in a ratio range between about 1:1 and 1:1.5.

* * * * *